(12) United States Patent
Chen et al.

(10) Patent No.: US 8,472,602 B2
(45) Date of Patent: Jun. 25, 2013

(54) CONFERENCE WAITING ROOM METHOD AND APPARATUS

(75) Inventors: Humphrey Chen, Palisades Park, NJ (US); Jeffrey G. Gartner, Hopewell Junction, NY (US)

(73) Assignee: Avaya Inc., Basking Ridge, NJ (US)

( * ) Notice: Subject to any disclaimer, the term of this patent is extended or adjusted under 35 U.S.C. 154(b) by 974 days.

(21) Appl. No.: 12/547,060

(22) Filed: Aug. 25, 2009

(65) Prior Publication Data

US 2011/0051917 A1     Mar. 3, 2011

(51) Int. Cl.
*H04M 3/42* (2006.01)
(52) U.S. Cl.
USPC ..................................... 379/202.01; 370/261
(58) Field of Classification Search
USPC ............. 379/202.01, 203.01, 204.01, 205.01, 379/201.01; 370/259, 260, 261, 262, 263; 455/416, 414.1
See application file for complete search history.

(56) References Cited

U.S. PATENT DOCUMENTS

| | | | |
|---|---|---|---|
| 2006/0182249 A1* | 8/2006 | Archambault et al. | .. 379/202.01 |
| 2010/0165889 A1* | 7/2010 | Madabhushi et al. | ........ 370/261 |

* cited by examiner

*Primary Examiner* — Antim Shah
(74) *Attorney, Agent, or Firm* — Maldjian Law Group LLC; John P. Maldjian, Esq.; Alexander D. Walter, Esq.

(57) ABSTRACT

The present invention comprises a method for hosting: (i) a first conference call on a first teleconferencing bridge from time $t_A$ to time $t_B$, and (ii) a second conference call on the first teleconferencing bridge from time $t_B$ to time $t_C$. When a teleconferencing manager receives a request from a telecommunications terminal at time $t_D$ to connect to the second conference call, the teleconferencing manager determines whether the request received at time $t_D$ is greater than or less than time $t_B$. If the request received at time $t_D$ from the telecommunications terminal is greater than time $t_B$, then the telecommunications terminal is connected to the first teleconferencing bridge. On the other hand, if the request from the telecommunications terminal received at time $t_D$ is less than time $t_B$, then the telecommunications terminal is connected to a third conference call on a second teleconferencing bridge.

7 Claims, 8 Drawing Sheets

CONFERENCE WAITING ROOM METHOD AND APPARATUS

FIELD OF THE INVENTION

The present invention relates to telecommunications in general, and, more particularly, to teleconferencing bridges.

BACKGROUND OF THE INVENTION

In the field of telecommunications, a conference call is a meeting between two or more people. Conference calls are a low-cost alternative for allowing a group of people to communicate with one another in a single place at a single time. But how does a person schedule a conference call?

A person can schedule a conference call by contacting a teleconferencing manager that is equipped with one or more teleconferencing bridges. This person contacting the teleconferencing manager to schedule a conference call is referred to as a host. By contacting the teleconferencing manager, the host is able to setup a conference call for a specific date and time on a teleconferencing bridge.

A teleconferencing bridge may have several conference calls scheduled for a specific day. For instance, a first conference call is scheduled from Noon to 1 p.m. and a second conference call is scheduled from 1 p.m. to 2 p.m. on the same day. But what happens when a person tries to connect to the teleconferencing bridge ahead-of-time or prior to the host connecting to the teleconferencing bridge?

Often, when a conference call is still in progress, many people that are scheduled to participate in a subsequent conference call try to connect to the teleconferencing bridge ahead-of-time or prior to the host connecting to the teleconferencing bridge. In this situation, instead of allowing them to begin their meeting earlier than scheduled, these people are put-on-hold until the conference call is complete or until the host connects to the teleconferencing bridge. By being on-hold, valuable time is wasted and productivity is decreased.

In another situation, when the same conference call ID and participant code are used to access two conference calls that are scheduled back-to-back (i.e., a first conference call is scheduled from Noon to 1 p.m. and a second conference call is scheduled from 1 p.m. to 2 p.m. on the same day), people that are scheduled to participate in the second conference call are able to join the first conference call prior to the first conference call being complete. This occurs because the conference call ID and participant code for the first conference call are reused and assigned to the second conference call. In this situation, by reusing the same conference call ID and participant code for accessing the first conference call and the second conference call, confidentiality and privacy rights of the first conference call are violated.

SUMMARY OF THE INVENTION

The present invention allows a telecommunications terminal to connect to a teleconferencing bridge in a way that avoids some of the costs and disadvantageous for doing so in the prior art.

The present invention comprises a method for hosting:
i. a first conference call on a first teleconferencing bridge from time $t_A$ to time $t_B$, and
ii. a second conference call on the first teleconferencing bridge from time $t_B$ to time $t_C$.
In the illustrative embodiment, the second conference call commences when the first conference call is complete.

When a teleconferencing manager receives a request from a telecommunications terminal at time $t_D$ to connect to the second conference call, the teleconferencing manager determines whether the request received at time $t_D$ is greater than or less than time $t_B$.

If the request received at time $t_D$ from the telecommunications terminal is greater than time $t_B$, then the telecommunications terminal is connected to the first teleconferencing bridge.

On the other hand, if the request from the telecommunications terminal received at time $t_D$ is less than time $t_B$, then the telecommunications terminal is connected to a third conference call on a second teleconferencing bridge.

An advantage of the illustrative embodiment is that when people call ahead-of-time, they are able to begin their meeting in a third conference call on a second teleconferencing bridge instead of being on-hold until the first conference call is complete, or, until the host connects to the teleconferencing bridge. Therefore, valuable time is used efficiently and productivity is increased.

The illustrative embodiment of the present invention comprises: (i) hosting: a first conference call on a first teleconferencing bridge from time $t_A$ to time $t_B$, and a second conference call on the first teleconferencing bridge from time $t_B$ to time $t_C$, (ii) receiving a request to connect a call to the second conference call at time $t_D$, (iii) when $t_B < t_D$, connecting a first telecommunications terminal associated with the call to the first teleconferencing bridge, and (iv) when $t_D < t_B$, connecting the first telecommunications terminal associated with the call to a third conference call on a second teleconferencing bridge.

DETAILED DESCRIPTION

Figure 1:
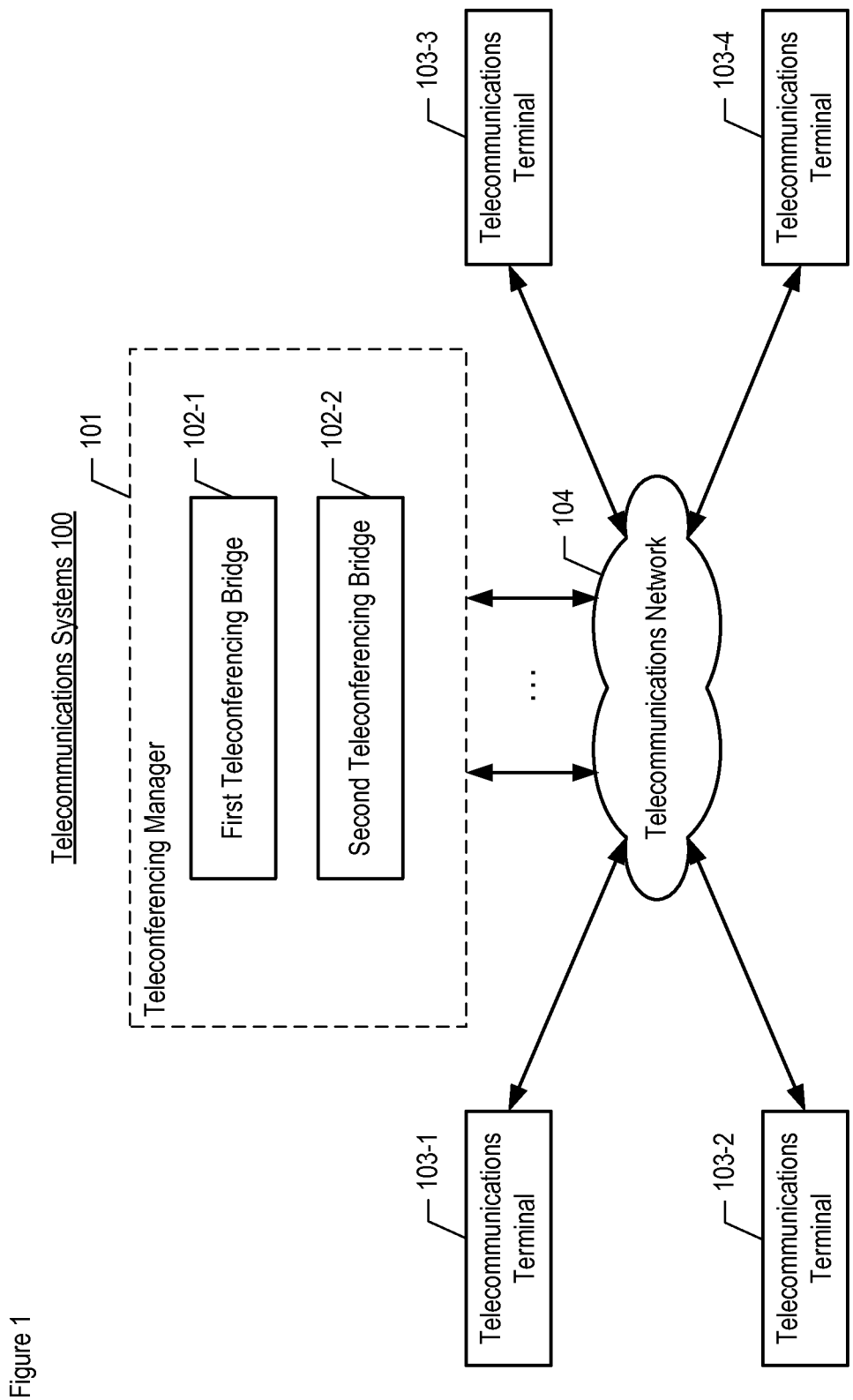
FIG. 1 depicts a schematic diagram of the salient components of telecommunications systems 100 in accordance with the illustrative embodiment of the present invention.

FIG. 1 depicts a schematic diagram of the salient components of telecommunications systems 100 in accordance with the illustrative embodiment of the present invention. Telecommunications system 100 comprises: teleconferencing manager 101, a first teleconferencing bridge 102-1, a second teleconferencing bridge 102-2, telecommunications terminals 103-1 through 103-4, and telecommunications network 104.

Although the illustrative embodiment comprises one teleconferencing manager, it will be clear to those skilled in the art, after reading this disclosure, how to make and use alternative embodiments of the present invention that comprises any number of teleconferencing managers.

Although the illustrative embodiment comprises two teleconferencing bridges, it will be clear to those skilled in the art, after reading this disclosure, how to make and use alternative embodiments of the present invention that comprises any number of teleconferencing bridges (e.g., three teleconferencing bridges, four teleconferencing bridges, five teleconferencing bridges, etc.).

Although both teleconferencing bridges 102-1 and 102-2 are within teleconferencing manager 101, it will be clear to those skilled in the art, after reading this disclosure, how to make and use alternative embodiments of the present invention in which one or more teleconference bridges is in one teleconferencing manager and one or more teleconferencing bridges is in another teleconferencing manager.

Although the illustrative embodiment comprises four telecommunications terminals, it will be clear to those skilled in the art, after reading this disclosure, how to make and use alternative embodiments of the present invention that comprises any number of telecommunications terminals (e.g., five telecommunications terminals, six telecommunications terminals, seven telecommunications terminals, etc.)

Although the illustrative embodiment comprises one telecommunications network, it will be clear to those skilled in the art, after reading this disclosure, how to make and use alternative embodiments of the present invention that comprises any number and combination of telecommunications networks.

Teleconferencing manager 101 comprises hardware and software for:
  i. receiving a request to schedule one or more conference calls from telecommunications terminals 103-1 through 103-4, and
  ii. scheduling one or more conference calls on the first teleconferencing bridge 102-1 or the second teleconferencing bridge 102-2, and
  iii. allocating communications resources to set up one or more conference calls on the first teleconferencing bridge 102-1 or the second teleconferencing bridge 102-2 on an ad-hoc basis, and
  iv. determining if the telecommunications terminals 103-1 through 103-4 are authorized to connect to the first teleconferencing bridge 102-1 or the second teleconferencing bridge 102-2, and
  v. connecting the telecommunications terminals 103-1 through 103-4 to the first teleconferencing bridge 102-1 or the second teleconferencing bridge 102-2, and
  vi. coordinating multiple conference calls between telecommunications terminals 103-1 through 103-4, and
  vii. receiving, before or after a conference call has commenced, a command from either a host telecommunications terminal or a participant telecommunications terminal that prevents other telecommunications terminals from connecting to the first teleconferencing bridge 102-1 or the second teleconferencing bridge 102-2, and
  viii. receiving, before or after a conference call has commenced, a command from either a host telecommunications terminal or a participant telecommunications terminal that connects other telecommunications terminals on a different teleconferencing bridge to the first teleconferencing bridge 102-1 or the second teleconferencing bridge 102-2.

In particular, teleconferencing manager 101 is capable of performing the tasks described below and in the accompanying figures.

First teleconferencing bridge 102-1 and second teleconferencing bridge 102-2 both comprise hardware and software associated with teleconferencing manager 101. First teleconferencing bridge 102-1 and second teleconferencing bridge 102-2 are where telecommunications terminals 103-1 through 103-4 connect and communicate with one another through telecommunications network 104. At designated times, teleconferencing manager 101 is configured to set up one or more teleconferencing bridges to allow multiple telecommunications terminals to connect to one another. Additionally, teleconferencing manager 101 is configured to schedule more than one conference call on the same teleconferencing bridge at the same time. These teleconferencing bridges can host conference calls with as few as two people, with no pre-set upper limit on the number of participants in a conference call. Additionally, these teleconferencing bridges can be part of a teleconferencing manager or separate from the teleconferencing manager. It will be clear to those skilled in the art, after reading this disclosure, how to make and use the first teleconferencing bridge 102-1 and the second teleconferencing bridge 102-2.

Telecommunications terminals 103-1 through 103-4 comprise hardware and software that enables a user to contact and interact with:
  i. teleconferencing manager 101, and
  ii. first teleconferencing bridge 102-1, and
  iii. second teleconferencing bridge 102-2, and
  iv. other telecommunications terminals,
through telecommunications network 104. In accordance with the illustrative embodiment, telecommunications terminals 103-1 through 103-4 are wireline telecommunications terminals (e.g., an office deskset, a desktop computer, etc.), but it will be clear to those skilled in the art, after reading this disclosure, how to make and use alternative embodiments of the present invention in which some or all of the telecommunications terminals connect to telecommunications network 104 via wireless (e.g., a cell phone, a personal digital assistant, a smart-phone, etc.). In any case, it will be clear to those skilled in the art how to make and use telecommunications terminals 103-1 through 103-4.

Telecommunications network 104 is the Public Switched Telephone Network (PSTN), but it will be clear to those skilled in the art, after reading this disclosure, how to make and use alternative embodiments of the present invention in which telecommunications network 104 is a different network or a combination of different networks (e.g., the Internet, a private data network, a satellite network, etc.).

Figure 2:
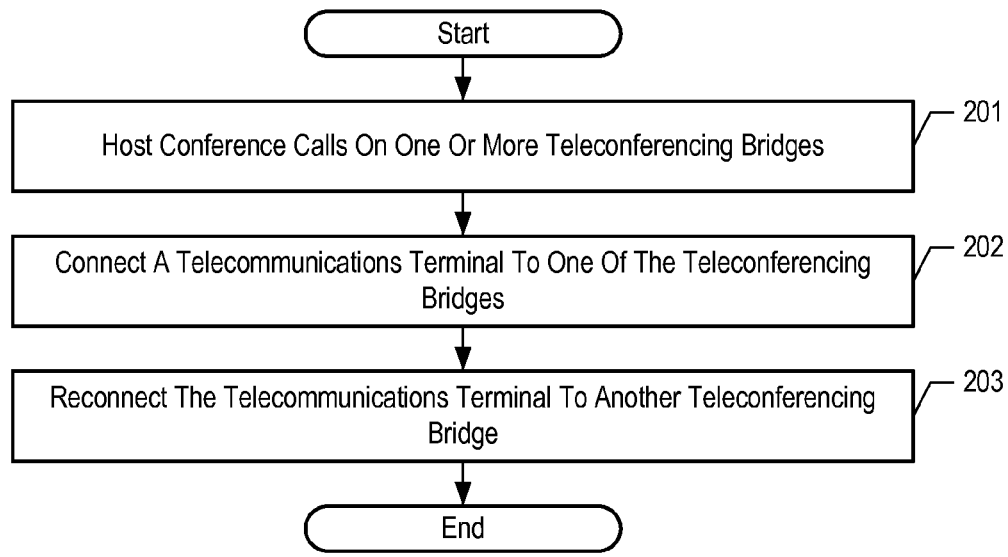
FIG. 2 depicts a flowchart of the salient tasks associated with the operation of the illustrative embodiment of the present invention.

FIG. 2 depicts a flowchart of the salient tasks associated with the operation of the illustrative embodiment of the present invention.

It will be clear to those skilled in the art, after reading this disclosure, how to make and use alternative embodiments of the present invention in which tasks 201, 202, and 203 are performed in a different order or are performed concurrently. Furthermore, it will be clear to those skilled in the art, after reading this disclosure, how to make and use alternative embodiments of the present invention that omit one or more tasks 201, 202, and 203.

At task 201, the user of telecommunications terminal 103-1 contacts teleconferencing manager 101 to schedule a first conference call. As part of task 201, the user of telecommunications terminal 103-1 communicates to teleconferencing manager 101 a desired date and time for the first conference call, and, information regarding the participants that are authorized to connect to the first conference call. For example, the user of telecommunications terminal 103-1 communicates to teleconferencing manager 101 that the first conference call is to be scheduled for:

Monday, Jan. 1, 2009, from time $t_A$ to time $t_B$

Once the date and time of the first conference call is set up, the user of telecommunications terminal 103-1 communicates to the teleconferencing manager 101 that:

Telecommunications terminal 103-2 is authorized to connect to the first conference call on the first teleconferencing bridge from time $t_A$ to time $t_B$.

Additionally, as part of task 201, the user of telecommunications terminal 103-1 schedules a second conference call. The user of telecommunications terminal 103-1 communicates to teleconferencing manager 101 that the second conference call is to be scheduled for:

Monday, Jan. 1, 2009, from time $t_B$ to time $t_C$

Once the date and time of the second conference call is set up, the user of telecommunications terminal 103-1 communicates to the teleconferencing manager 101 that:

Telecommunications terminal 103-3

Telecommunications terminal 103-4 are authorized to connect to the second conference call on the first teleconferencing bridge from time $t_B$ to time $t_C$.

In accordance with the illustrative embodiment, the user of telecommunications terminal 103-1 schedules the first conference call and the second conference call by dialing a telephone number associated with the teleconferencing manager 101, but it will be clear to those skilled in the art, after reading this disclosure, how to make and use alternative embodiments of the present invention in which the user of telecommunications terminal 103-1 contacts teleconferencing manager 101 and schedules the conference calls via e-mail, a web interface, a graphical user interface, short message service (SMS), etc.

Additionally, it will be clear to those skilled in the art, after reading this disclosure, how to make and use alternative embodiments of the present invention in which the telecommunications terminal 103-1 contacts, for example, an operator's telecommunications terminal, an administrator's telecommunications terminal, an attendant's telecommunications terminal, etc. via e-mail, a web interface, a graphical user interface, short message service (SMS), etc. to schedule a conference call. Once the attendant receives the request to schedule a conference call from the user of telecommunications terminal 103-1, the attendant contacts teleconferencing manager 101 to set up the conference call on a teleconferencing bridge for the desired date and time.

Additionally, in accordance with the illustrative embodiment, the user of telecommunications terminal 103-1 contacts teleconferencing manager 101 in advance to schedule the first conference call and the second conference call (e.g., within a few days, within a few weeks, or within a few months of the desired date and time of the conference calls), but it will be clear to those skilled in the art, after reading this disclosure, how to make and use alternative embodiments of the present invention in which the user of telecommunications terminal 103-1 sets up a conference call on an ad-hoc basis when teleconferencing manager 101, teleconferencing bridge 102-1, or teleconferencing bridge 102-2 have additional communications resources available (e.g., setting up a conference call within the next few seconds, within the next few minutes, within the next few hours of the user of telecommunications terminal 103-1 contacting teleconferencing manager 101 to set up a conference call).

Additionally, in accordance with the illustrative embodiment, since the user of telecommunications terminal 103-1 is the person that contacts teleconferencing manager 101 to schedule the first conference call and the second conference call, the user of telecommunications terminal 103-1 is the host of the first conference call and the second conference call, but it will be clear to those skilled in the art, after reading this disclosure, how to make and use alternative embodiments of the present invention in which the user of telecommunications terminal 103-1 can designate other users and other telecommunications terminals as the host of the first conference call and/or the second conference call.

Additionally, it will be clear to those skilled in the art, after reading this disclosure, how to make and use alternative embodiments of the present invention in which the user of telecommunications terminal 103-1 is given the option to choose from a plurality of teleconferencing bridges to host the first conference call and the second conference call. Task 201 is described in detail below and with respect to FIG. 4.

At task 202, teleconferencing manager 101 receives from each telecommunications terminals 103-1 through 103-4, a request to connect to a conference call on the first teleconferencing bridge 102-1. The teleconferencing manager 101 connects telecommunications terminals 103-1 through 103-4 to either the first teleconferencing bridge 102-1 or the second teleconferencing bridge 102-2 based, at least in part, on:

i. whether the user and the associated telecommunications terminal are authorized to connect to the first teleconferencing bridge 102-1, or ii. the time the request was received at the teleconferencing manager 101, or iii. a command transmitted by a host's telecommunications terminal or a participant's telecommunications terminal that prevents other telecommunications terminals from connecting to the first teleconferencing bridge 102-1, or iv. a command transmitted by a host's telecommunications terminal or a participant's telecommunications terminal that permits other telecommunications terminal on a different teleconferencing bridge to connect to the first teleconferencing bridge 102-1, or v. any combination of i, ii, iii, and iv.

Task 202 is described in detail below and with respect to FIG. 5.

At task 203, the telecommunications terminals connected to the second teleconferencing bridge 102-2 are disconnected from the second teleconferencing bridge and reconnected to the first teleconferencing bridge 102-1 after the conference call on the first teleconferencing bridge 102-1 is complete (i.e., at time $t_B$).

It will be clear to those skilled in the art, after reading this disclosure, how to make and use alternative embodiments of the present invention in which the telecommunications terminals connected to the second teleconferencing bridge 102-2 could also be reconnected to the first teleconferencing bridge 102-1 based, at least in part, on a host telecommunications terminal transmitting a command to the teleconferencing manager 101 or the first teleconferencing bridge 102-1 that permits a specified telecommunications terminal to connect to the first teleconferencing bridge. Task 203 is described in detail below with respect to FIG. 6.

Figure 3:
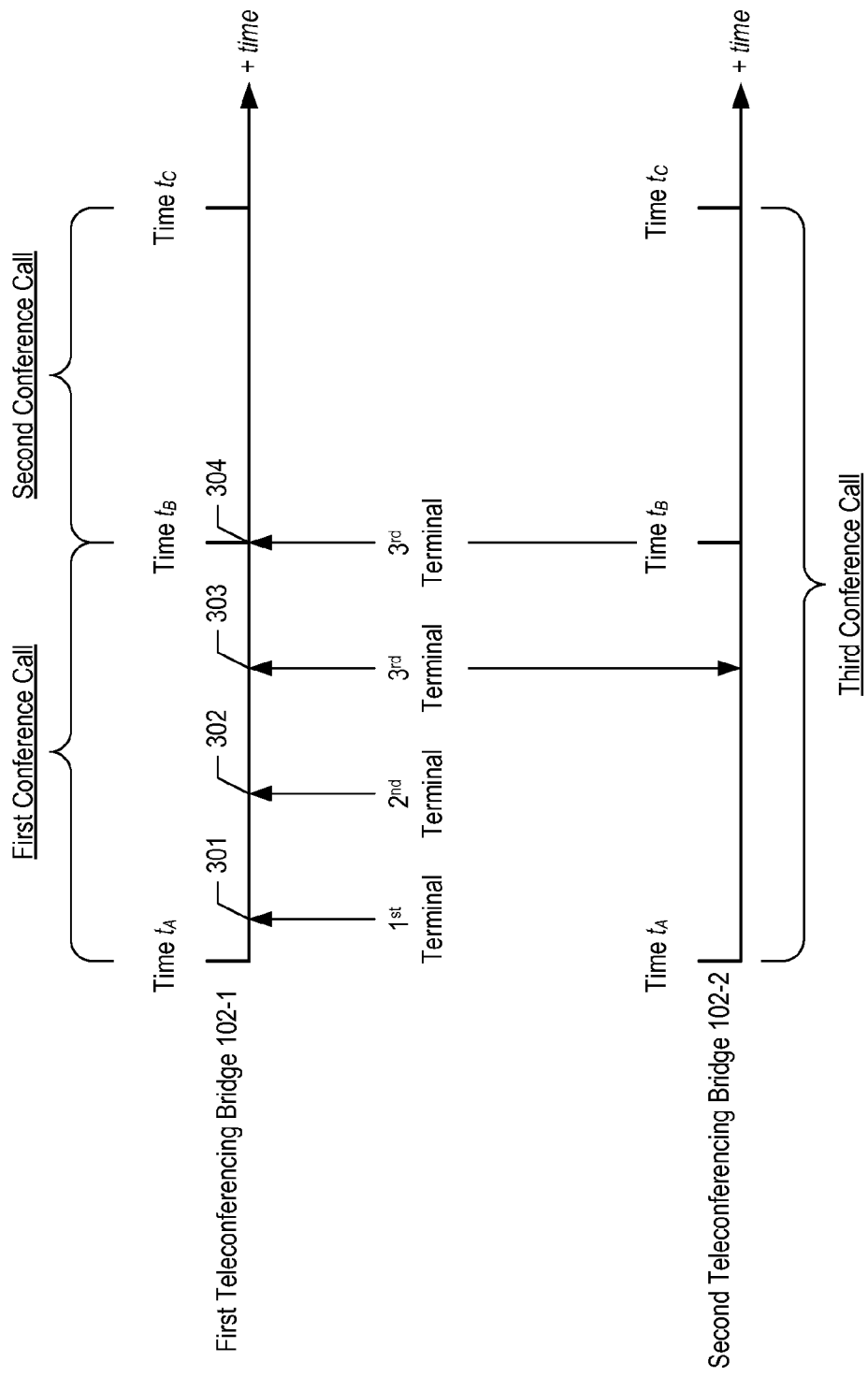
FIG. 3 is a timeline of the salient tasks associated with the operation of the illustrative embodiment of the present invention.

FIG. 3 is a timeline of the salient tasks associated with the operation of the illustrative embodiment of the present invention.

It will be clear to those skilled in the art, after reading this disclosure, how to make and use alternative embodiments of the present invention in which the tasks associated with time 301, 302, 303, and 304 are performed in a different order or are performed concurrently. Furthermore, it will be clear to those skilled in the art, after reading this disclosure, how to make and use alternative embodiments of the present invention that omit one or more tasks associated with time 301, 302, 303, and 304.

At time 301, teleconferencing manager 101 receives a request from telecommunications terminal 103-1 to connect to the first teleconferencing bridge 102-1. Since the user of telecommunications terminal 103-1 is scheduled to participate in the first conference call from time $t_A$ to time $t_B$, and, because the request is received between time $t_A$ and time $t_B$ of the first conference call, teleconferencing manager 101 connects telecommunications terminal 103-1 to the first conference call on the first teleconferencing bridge 102-1.

At time 302, teleconferencing manager 101 receives a request from telecommunications terminal 103-2 to connect to the first teleconferencing bridge 102-1. Since the user of telecommunications terminal 103-2 is scheduled to participate in the first conference call from time $t_A$ to time $t_B$, and, because the request is received between time $t_A$ and time $t_B$ of the first conference call, teleconferencing manager 101 connects telecommunications terminal 103-2 to the first conference call on the first teleconferencing bridge 102-1.

At time 303, teleconferencing manager 101 receives a request from telecommunications terminal 103-3 to connect to the first teleconferencing bridge 102-1. Since:

i. the request from telecommunications terminal 103-3 is received between time $t_A$ and time $t_B$ of the first conference call, and
ii. the user of telecommunications terminal 103-3 is not scheduled to participate in the first conference call from time $t_A$ to time $t_B$, and
iii. the user of telecommunications terminal 103-3 is scheduled to participate in the second conference call on the first teleconferencing bridge 102-1 from time $t_B$ to time $t_C$, the teleconferencing manager 101 does not connect telecommunications terminal 103-3 to the first conference call on the first teleconferencing bridge 102-1. Instead, the teleconferencing manager 101 connects telecommunications terminal 103-3 to a third conference call on a second teleconferencing bridge 102-2 until the first conference call is complete (i.e., at time $t_B$).

It will be clear to those skilled in the art, after reading this disclosure, how to make and use alternative embodiments of the present invention in which connecting telecommunications terminal 103-3 to the third conference call on the second teleconferencing bridge 102-2 is also based, at least in part, on the user of telecommunications terminal 103-1 (i.e., the host telecommunications terminal) transmitting a command to teleconferencing manager 101 or teleconferencing bridge 102-1 that prevents telecommunications terminal 103-3 from connecting to the first teleconferencing bridge 102-1.

At time 304, teleconferencing manager 101 reconnects telecommunications terminal 103-3 to the second conference call on the first teleconferencing bridge 102-1 once the first conference call on the first teleconferencing bridge 102-1 is complete (i.e., at time $t_B$).

In accordance with the illustrative embodiment, telecommunications terminal 103-3 is reconnected to the first teleconferencing bridge 102-1 once the first conference call on the first teleconferencing bridge 102-1 is complete, but it will be clear to those skilled in the art, after reading this disclosure, how to make and use alternative embodiments of the present invention in which telecommunications terminal 103-3 is reconnected to the first teleconferencing bridge 102-1 based, at least in part, on the user of telecommunications terminal 103-1 (i.e., the host telecommunications terminal) transmitting a command to the teleconferencing manager 101 or the first teleconferencing bridge 102-1 that reconnects telecommunications terminal 103-3 to the first teleconferencing bridge 102-1.

Figure 4:
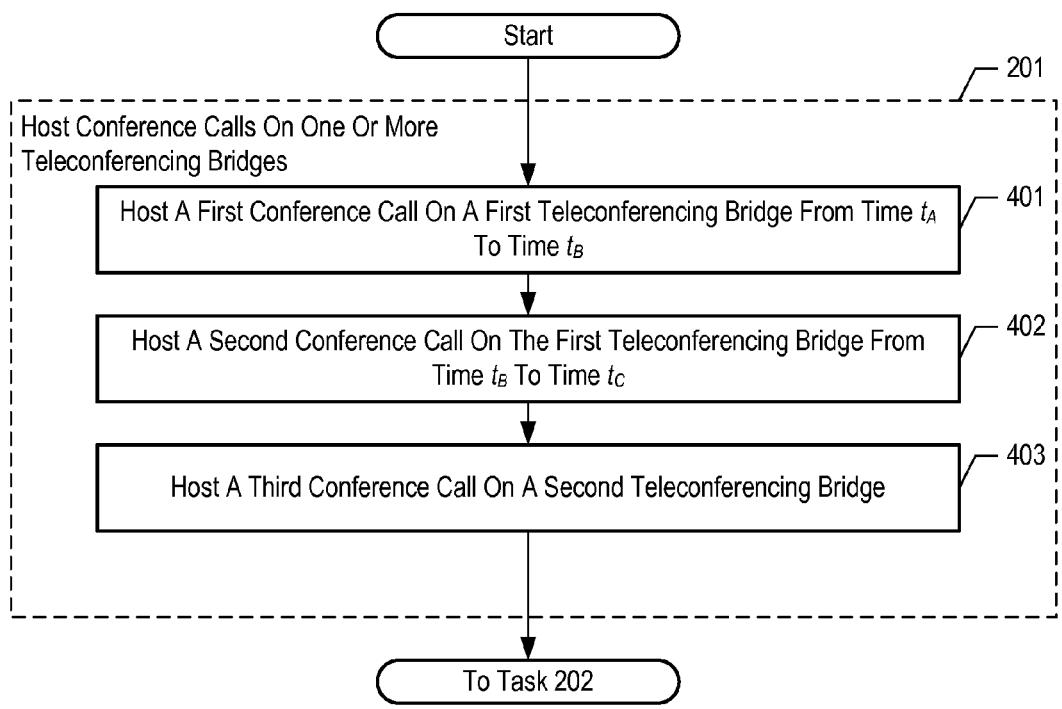
FIG. 4 depicts a flowchart of the salient tasks associated with the operation of task 201 in accordance with the illustrative embodiment of the present invention.

FIG. 4 depicts a flowchart of the salient tasks associated with the operation of task 201.

It will be clear to those skilled in the art, after reading this disclosure, how to make and use alternative embodiments of the present invention in which tasks 401, 402, and 403 are performed in a different order or are performed concurrently. Furthermore, it will be clear to those skilled in the art, after reading this disclosure, how to make and use alternative embodiments of the present invention that omit one or more tasks 401, 402, and 403.

At task 401, the teleconferencing manager 101 hosts the first conference call on the first teleconferencing bridge 102-1 from time $t_A$ to time $t_B$.

At task 402, once the first conference call ends at time $t_B$, the teleconferencing manager 101 hosts the second conference call on the first teleconferencing bridge 102-1 from time $t_B$ to time $t_C$.

At task 403, the teleconferencing manager 101 hosts a third conference call on a second teleconferencing bridge 102-2 so users that are not authorized to connect to the first teleconferencing bridge 102-1 at time $t_D$ can begin their meeting earlier than scheduled.

In accordance with the illustrative embodiment, teleconferencing manager 101 hosts the third conference call on the second teleconferencing bridge 102-2 based, at least in part, on a user not being authorized to connect to the first teleconferencing bridge 102-1, but it will be clear to those skilled in the art, after reading this disclosure, how to make and use alternative embodiments of the present invention in which teleconferencing manager 101 hosts the third conference call based, at least in part, on:

i. the commencement of the first conference call from time $t_A$ to time $t_B$, or
ii. the commencement of the second conference call from time $t_B$ to time $t_C$, or
iii. the user of telecommunications terminal 103-1 (i.e., the host telecommunications terminal) transmitting a command to the teleconferencing manager 101 or the first teleconferencing bridge 102-1 that prevents the telecommunications terminal 103-3 from connecting to the first teleconferencing bridge 102-1, or
iv. the user of telecommunications terminal 103-1 (i.e., the host telecommunications terminal) transmitting a command to the teleconferencing manager 101 or the second teleconferencing bridge 102-2 to begin hosting the third conference call, or
v. any combination of i, ii, iii, and iv.

Figure 5:
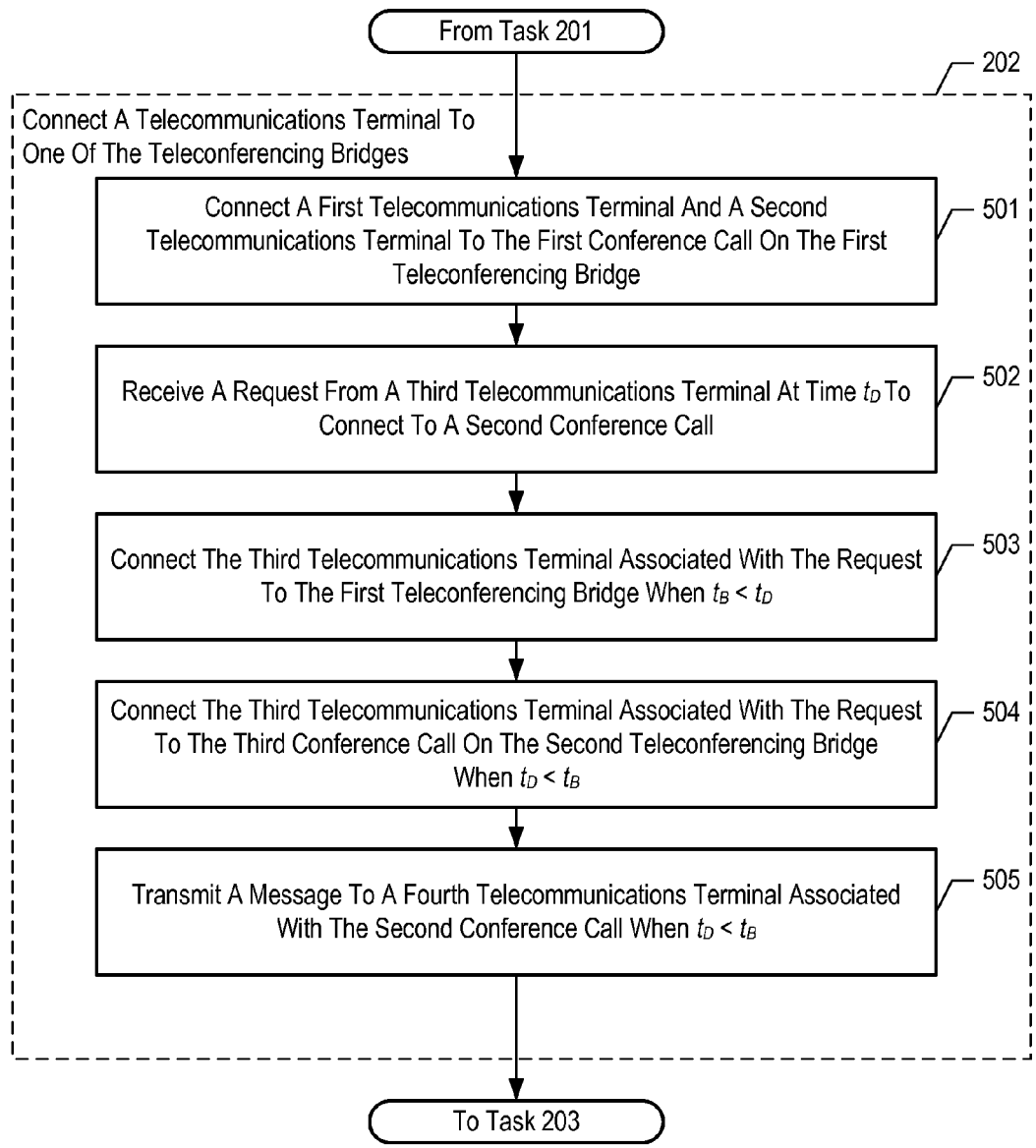
FIG. 5 depicts a flowchart of the salient tasks associated with the operation of task 202 in accordance with the illustrative embodiment of the present invention.

FIG. 5 depicts a flowchart of the salient tasks associated with the operation of task 202 in accordance with the illustrative embodiment.

It will be clear to those skilled in the art, after reading this disclosure, how to make and use alternative embodiments of the present invention in which tasks 501, 502, 503, 504, and 505 are performed in a different order or are performed concurrently. Furthermore, it will be clear to those skilled in the art, after reading this disclosure, how to make and use alternative embodiments of the present invention that omit one or more tasks 501, 502, 503, 504, and 505.

At task 501, teleconferencing manager 101 receives from each telecommunications terminals 103-1 and 103-2, a request to connect to the first teleconferencing bridge 102-1. Since the users of telecommunications terminals 103-1 and 103-2 are scheduled to participate in the first conference call from time $t_A$ to time $t_B$, and, because the requests are received between time $t_A$ and time $t_B$ of the first conference call, teleconferencing manager 101 connects telecommunications terminals 103-1 and 103-2 to the first conference call on the first teleconferencing bridge 102-1.

In accordance with the illustrative embodiment, telecommunications terminals 103-1 and 103-2 are connected to the first teleconferencing bridge 102-1 based on the users of telecommunications terminals 103-1 and 103-2 being scheduled to participate in the first conference call from time $t_A$ to time $t_B$, and, because the requests are received between time $t_A$ and time $t_B$ of the first conference call, but it will be clear to those skilled in the art, after reading this disclosure, how to make and use alternative embodiments of the present invention in which the request transmitted by the telecommunications terminals 103-1 and 103-2 to connect to the first conference call on the first teleconferencing bridge 102-1 include:

i. a user identifier, or
    ii. a user password, or
    iii. a conference call ID, or
    iv. a participant ID, or
    v. an identifier associated with the user's telecommunications terminal, or
    vi. any combination of i, ii, iii, iv, and v.

At task 502 the teleconferencing manager 101 receives a request from telecommunications terminal 103-3 at time $t_D$ to connect to the first teleconferencing bridge 102-1. In accordance with the illustrative embodiment, the user of telecommunications terminal 103-3 is not scheduled to participate in the first conference call from time $t_A$ to time $t_B$. Instead, the user of telecommunications terminal 103-3 is scheduled to participate in the second conference call from time $t_B$ to time $t_C$.

At task 503, the teleconferencing manager 101 determines whether $t_B < t_D$, and if it is, the teleconferencing manager 101 connects the telecommunications terminal 103-3 to the second conference call on the first teleconferencing bridge 102-1.

In other words, when $t_B < t_D$, the first conference call is complete, and, since the user of telecommunications terminal 103-3 is scheduled to participant in the second conference call after the first conference call is complete, teleconferencing manager 101 connects the telecommunications terminal 103-3 to the second conference call on the first teleconferencing bridge 102-1 based, at least in part, on receiving the request at time $t_D$.

At task 504, the teleconferencing manager 101 determines whether $t_D < t_B$, and if it is, the teleconferencing manager 101 connects the telecommunications terminal 103-3 to a third conference call on a second teleconferencing bridge 102-2.

In other words, when $t_D < t_B$, the first conference call is still in progress, and, since the teleconferencing manager 101 received the request when the first conference call is still in progress, the teleconferencing manager 101 connects the telecommunications terminal 103-3 to a third conference call on a second teleconferencing bridge 102-2 based, at least in part, on receiving the request at time $t_D$.

In accordance with the illustrative embodiment, the request transmitted at time $t_D$ is received by the teleconferencing manager 101 when the first conference call is still in progress (i.e., $t_D < t_B$). Since the user of telecommunications terminal 103-3 is scheduled to participate in the second conference call, and because $t_D < t_B$, the telecommunications terminal 103-3 is connected to the third conference call on the second teleconferencing bridge 102-2.

Additionally, it will be clear to those skilled in the art, after reading this disclosure, how to make and use alternative embodiments of the present invention in which teleconference manager 101 also connects the third telecommunications terminal 103-3 to the second conference call on the first teleconferencing bridge 102-1 based, at least in part, on:

i. receiving a request at time $t_D$ from a telecommunications terminal, or
    ii. a user identifier, or
    iii. a user password, or
    iv. a conference call ID, or
    v. a participant ID, or
    vi. an identifier associated with the user's telecommunications terminal, or vii. a command transmitted by the host's telecommunications terminal that permits a telecommunications terminal to connect to the second conference call on the first teleconferencing bridge 102-1, or
    viii. any combination of i, ii, iii, iv, v, vi, and vii.

At task 505, when telecommunications terminal 103-3 is connected to the third conference call on the second teleconferencing bridge 102-2, the teleconferencing manager 101 transmits a message to the user of telecommunications terminal 103-4. The message comprises:

i. information for accessing the third conference call on the second teleconferencing bridge 102-2, or
    ii. a rescheduled time of the second conference call, or
    iii. any combination of i and ii.

The advantage of transmitting the message is to notify the user of telecommunications terminal 103-4 that the meeting can begin earlier than scheduled or that the second conference call is rescheduled to a later time.

In the illustrative embodiment, a message is transmitted to telecommunications terminal 103-4. In response to the message, teleconferencing manager 101 receives a request from telecommunications terminal 103-4 to connect to the second conference call since the user of telecommunications terminal 103-4 is available to begin the meeting earlier than scheduled. In response to the request from telecommunications terminal 103-4, teleconferencing manager 101 connects telecommunications terminal 103-4 to the third conference call on the second teleconferencing bridge 102-2 in a similar fashion as described in task 502, 503, and 504.

By connecting both telecommunications terminals 103-3 and 103-4 to the third conference call on the second teleconferencing bridge 102-2, the users are able to begin their meeting earlier than scheduled, which, therefore, results in valuable time being used efficiently and the increase in productivity.

Figure 6:
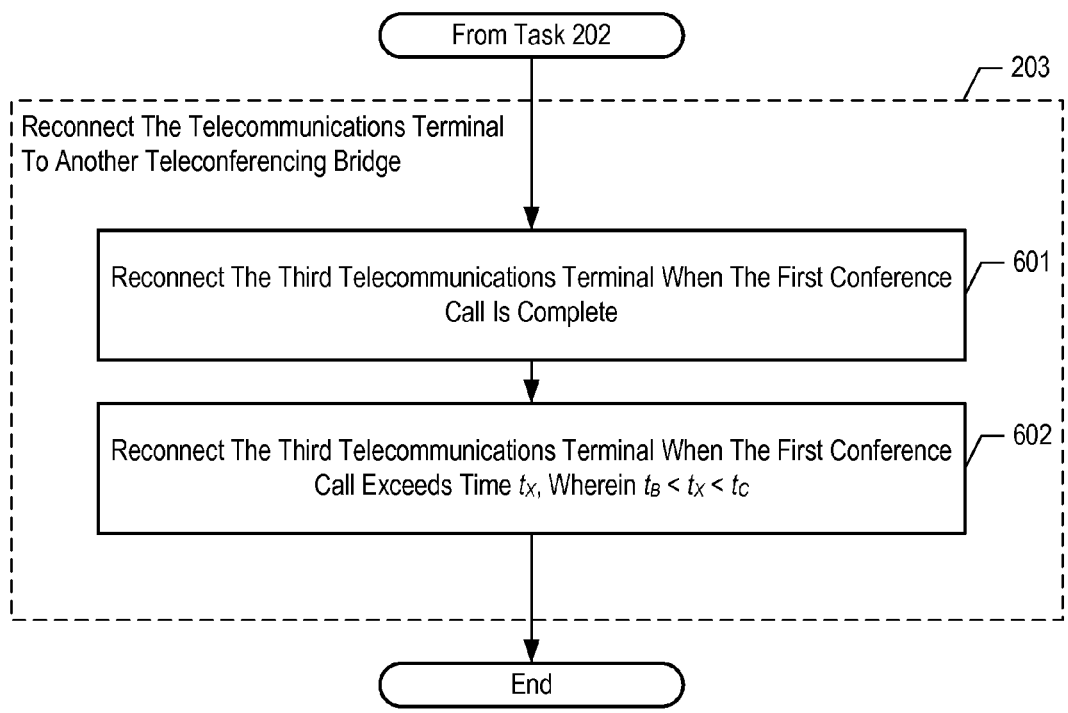
FIG. 6 depicts a flowchart of the salient task associated with the operation of task 203 in accordance with the illustrative embodiment of the present invention.

FIG. 6 depicts a flowchart of the salient tasks associated with the operation of task 203 in accordance with the illustrative embodiment.

It will be clear to those skilled in the art, after reading this disclosure, how to make and use alternative embodiments of the present invention in which tasks 601 and 602 are performed in a different order or are performed concurrently. Furthermore, it will be clear to those skilled in the art, after reading this disclosure, how to make and use alternative embodiments of the present invention that omit one or more tasks 601 and 602.

At task 601, telecommunications terminals 103-3 and 103-4 are disconnected from the third conference call on the second teleconferencing bridge 102-2 based, at least in part, on the first conference call completing at time $t_B$ as scheduled. The telecommunications terminals 103-3 and 103-4 are then reconnected to the second conference call on the first teleconferencing bridge 102-1.

At task 602, when the first conference call on the first teleconferencing bridge 102-1 is extended to time $t_X$, and, when the first conference call exceeds time $t_X$, the telecommunications terminals 103-3 and 103-4 are disconnected from the third conference call on the second teleconferencing bridge 102-2. Once disconnected, the telecommunications terminals 103-3 and 103-4 are reconnected to the second conference call on the first teleconferencing bridge 102-1.

Figure 7:
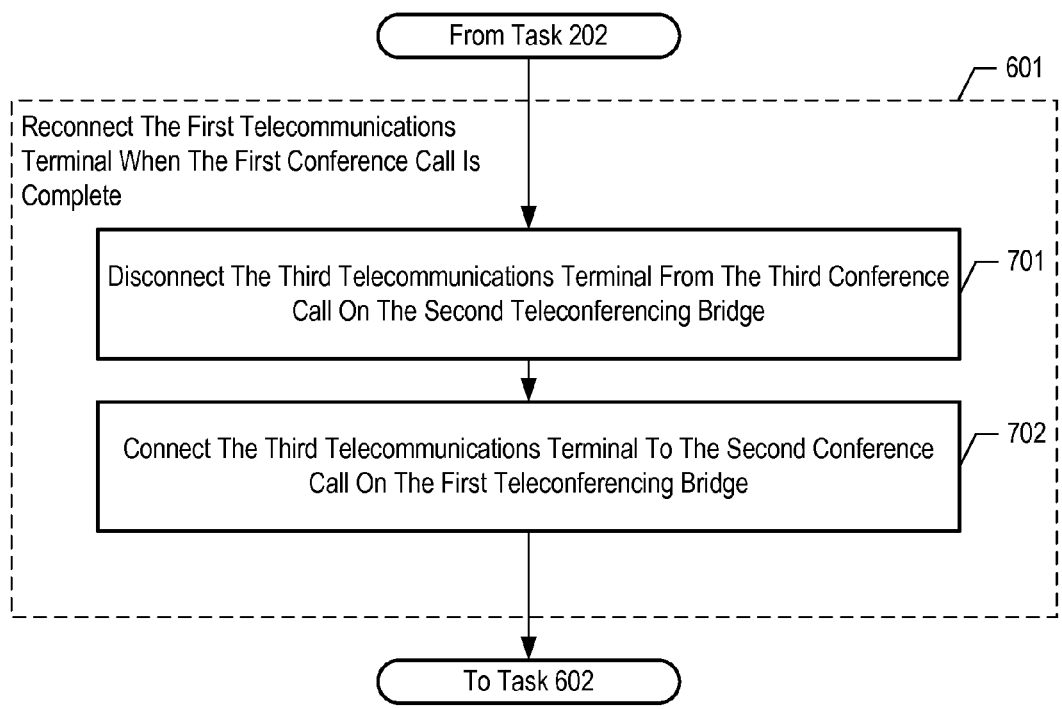
FIG. 7 depicts a flowchart of the salient task associated with the operation of task 601 in accordance with the illustrative embodiment of the present invention.

FIG. 7 depicts a flowchart of the salient task associated with the operation of task 601 in accordance with the illustrative embodiment of the present invention.

It will be clear to those skilled in the art, after reading this disclosure, how to make and use alternative embodiments of the present invention in which tasks 701 and 702 are performed in a different order or are performed concurrently. Furthermore, it will be clear to those skilled in the art, after reading this disclosure, how to make and use alternative embodiments of the present invention that omit one or more tasks 701 and 702.

At task 701, when the first conference call on the first teleconferencing bridge 102-1 is complete, the teleconferencing manager 101 disconnects the telecommunications terminals 103-3 and 103-4 from the third conference call on the second teleconferencing bridge 102-2.

At task 702, the teleconferencing manager 101 reconnects the telecommunications terminals 103-3 and 103-4 to the second conference call on the first teleconferencing bridge 102-1.

In the illustrative embodiment, the teleconferencing manager 101 disconnects telecommunications terminals 103-3 and 103-4 from the third conference call on the second teleconferencing bridge 102-2 and reconnects them to the second conference call on the first teleconferencing bridge 102-1, but it will be clear to those skilled in the art, after reading this disclosure, how to make and use alternative embodiments of the present invention in which all the telecommunications terminals in the third conference call on the second teleconferencing bridge 102-2 are disconnected and reconnected to the second conference call on the first teleconferencing bridge 102-1 in a similar fashion as described in task 701 and 702.

Figure 8:
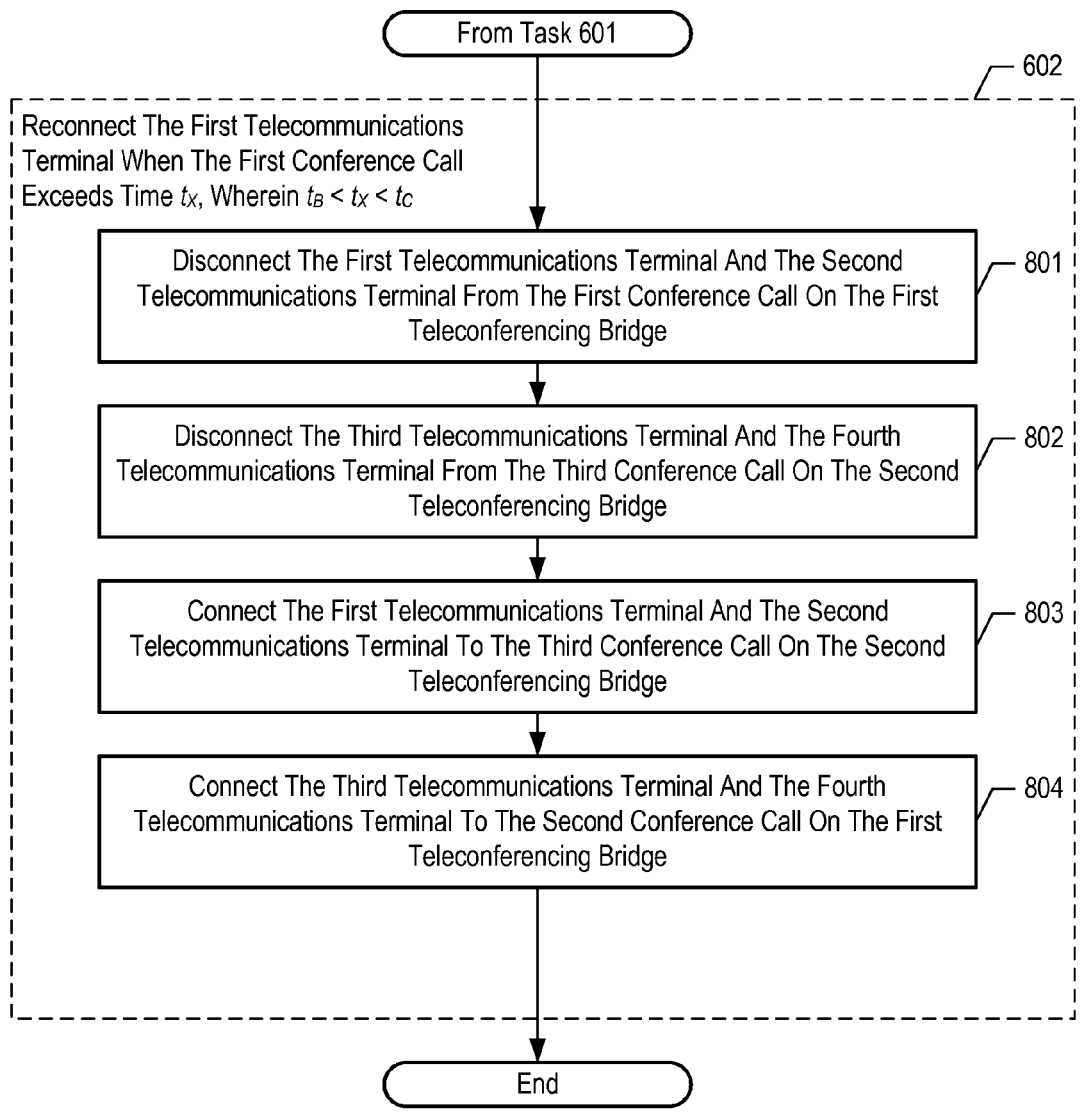
FIG. 8 depicts a flowchart of the salient task associated with the operation of task 602 in accordance with the illustrative embodiment of the present invention.

FIG. 8 depicts a flowchart of the salient task associated with the operation of task 602 in accordance with the illustrative embodiment of the present invention.

It will be clear to those skilled in the art, after reading this disclosure, how to make and use alternative embodiments of the present invention in which tasks 801, 802, 803, and 804 are performed in a different order or are performed concurrently. Furthermore, it will be clear to those skilled in the art, after reading this disclosure, how to make and use alternative embodiments of the present invention that omit one or more tasks 801, 802, 803, and 804.

As part of task 801, the first conference call on the first teleconferencing bridge is extended to time $t_X$. At task 801, when the first conference call exceeds time $t_X$, the teleconferencing manager 101 disconnects telecommunications terminals 103-1 and 103-2 from the first conference call on the first teleconferencing bridge 102-1.

At task 802, the teleconferencing manager 101 disconnects telecommunications terminals 103-3 and 103-4 from the third conference call on the second teleconferencing bridge 102-2.

At task 803, the teleconferencing manager 101 reconnects the telecommunications terminals 103-1 and 103-2 to the third conference call on the second teleconferencing bridge 102-2.

At task 804, the teleconferencing manager 101 reconnects the telecommunications terminals 103-3 and 103-4 to the second conference call on the first teleconferencing bridge 102-1.

It will be clear to those skilled in the art, after reading this disclosure, how to make and use alternative embodiments of the present invention in which all the telecommunications terminals in the first conference call and the third conference call are disconnected and reconnected in a similar fashion as described in task 801, 802, 803, and 804.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   hosting:
      i. a first conference call on a first teleconferencing bridge from time $t_A$ to time $t_B$, and
      ii. a second conference call on the first teleconferencing bridge from time $t_B$ to time $t_C$,
      wherein $t_A < t_B < t_C$;
   receiving a request to connect a call to the second conference call at time $t_D$ from a first telecommunications terminal that has not been identified in advance as authorized to connect to the first teleconference bridge at time $t_D$,
   wherein $t_A < t_D < t_C$;
      when $t_B < t_D$, connecting the first telecommunications terminal associated with the call to the first teleconferencing bridge; and
      when $t_D < t_B$, connecting the first telecommunications terminal associated with the call to a third conference call on a second teleconferencing bridge;
   when the first conference call exceeds time $t_X$, wherein $t_B < t_X < t_C$:
      disconnecting a second telecommunications terminal from the first conference call;
      disconnecting the first telecommunications terminal from the third conference call;
      connecting the second telecommunications terminal to the third conference call; and
      connecting the first telecommunications terminal to the second conference call.

2. The method of claim 1 further comprising:
   if the first conference call ends at a time that does not exceed time $t_X$, wherein $t_B < t_X < t_C$, perform the steps of:
   disconnecting the first telecommunications terminal from the third conference call; and
   connecting the first telecommunications terminal to the second conference call after the first conference call is complete.

3. The method of claim 1 further comprising:
   prior to time $t_X$, performing the step of:
   transmitting a message to a third telecommunications terminal after connecting the first telecommunications terminal to the third conference call;
   wherein the message includes at least one of:
      i. information for accessing the third conference call, and
      ii. a rescheduled time of the second conference call.

4. A method comprising:
   establishing a first conference call among a first telecommunications terminal and a second telecommunications terminal;

receiving, at a time before a second conference call has started, a request from a caller associated with a third telecommunications terminal to connect to the second conference call;

connecting the third telecommunications terminal to a third conference call based, at least in part, on the fact that the third telecommunications terminal has not been identified in advance as an authorized participant in the first conference call;

when the first conference call exceeds time t:

disconnecting the first telecommunications terminal and the second telecommunications terminal from the first conference call;

disconnecting the third telecommunications terminal from the third conference call;

connecting the first telecommunications terminal and the second telecommunications terminal to the third conference call; and connecting the third telecommunications terminal to the second conference call.

5. The method of claim 4 wherein the first conference call and second conference calls are hosted on a first teleconferencing bridge; and wherein the third conference call is hosted on a second teleconferencing bridge.

6. The method of claim 4 further comprising:

if the first conference call ends at a time that does not exceed time t, perform the steps of:

disconnecting the third telecommunications terminal from the third conference call; and connecting the third telecommunications terminal to the second conference call after the first conference call is complete.

7. The method of claim 4 further comprising:

prior to time t, performing the step of:

transmitting a message to a fourth telecommunications terminal after connecting the third telecommunications terminal to the third conference call; and wherein the message includes at least one of:

i. information for accessing the third conference call, and ii. a rescheduled time of the second conference call.

* * * * *